May 27, 1924.
L. A. GARSKE
BASKET
Filed Dec. 30, 1922 2 Sheets-Sheet 1
1,495,837
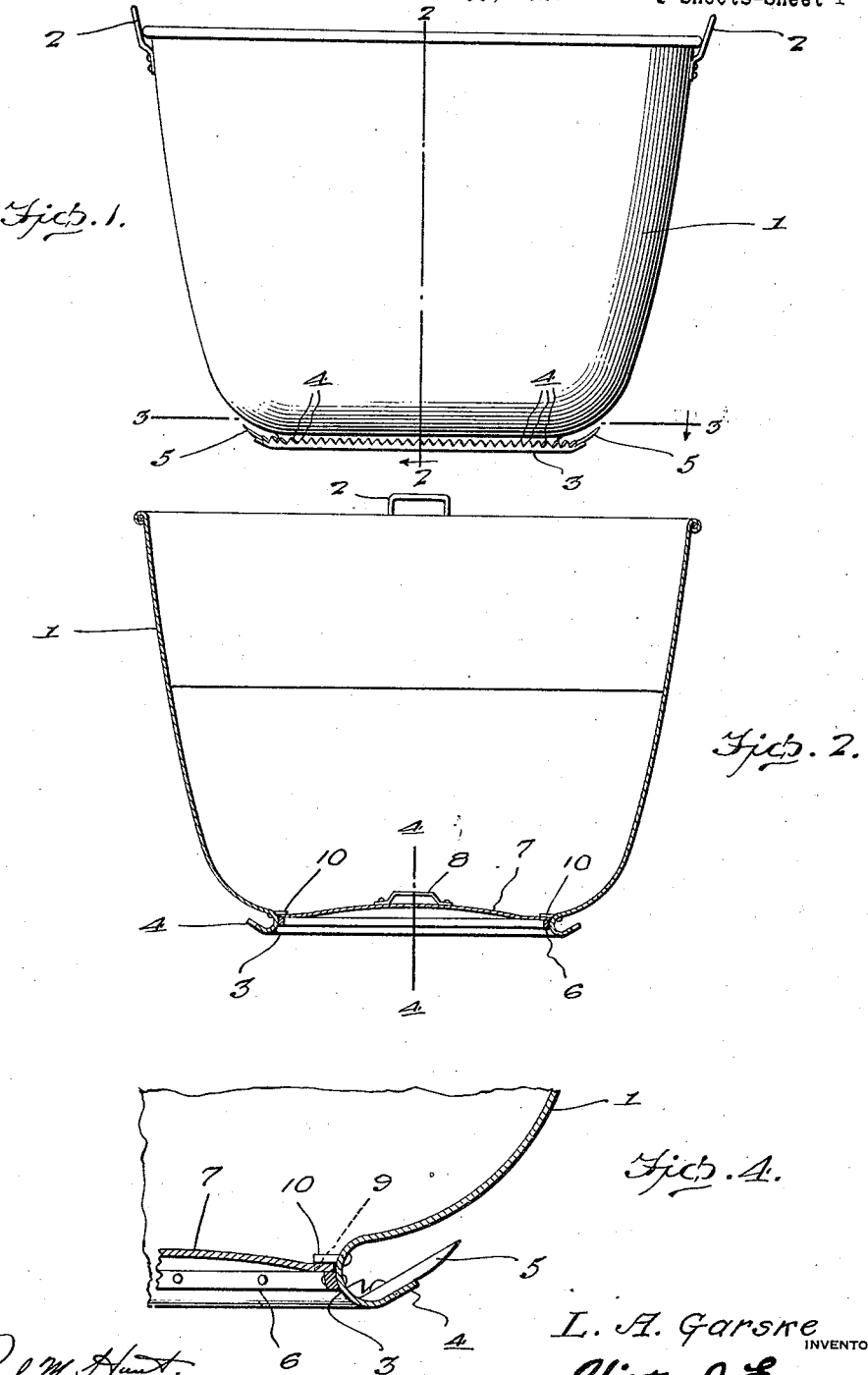

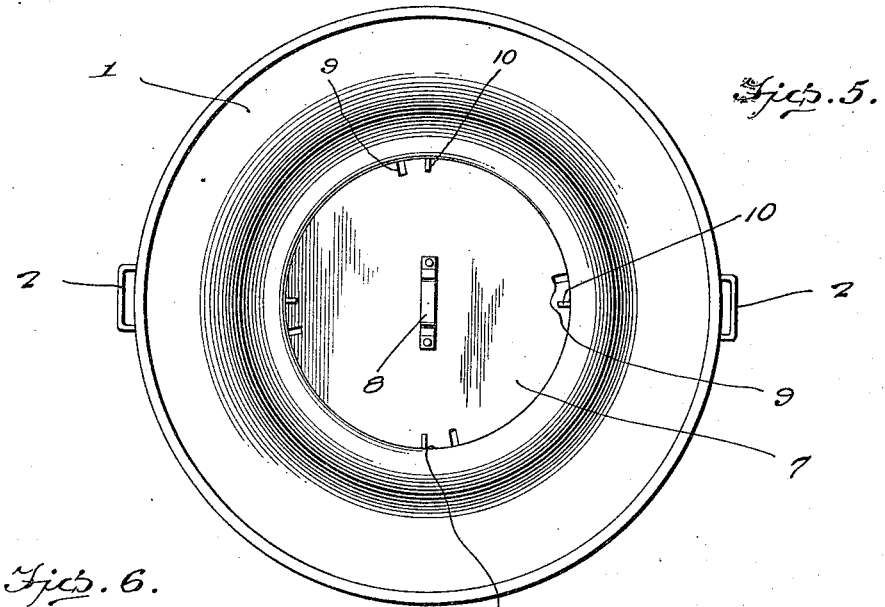
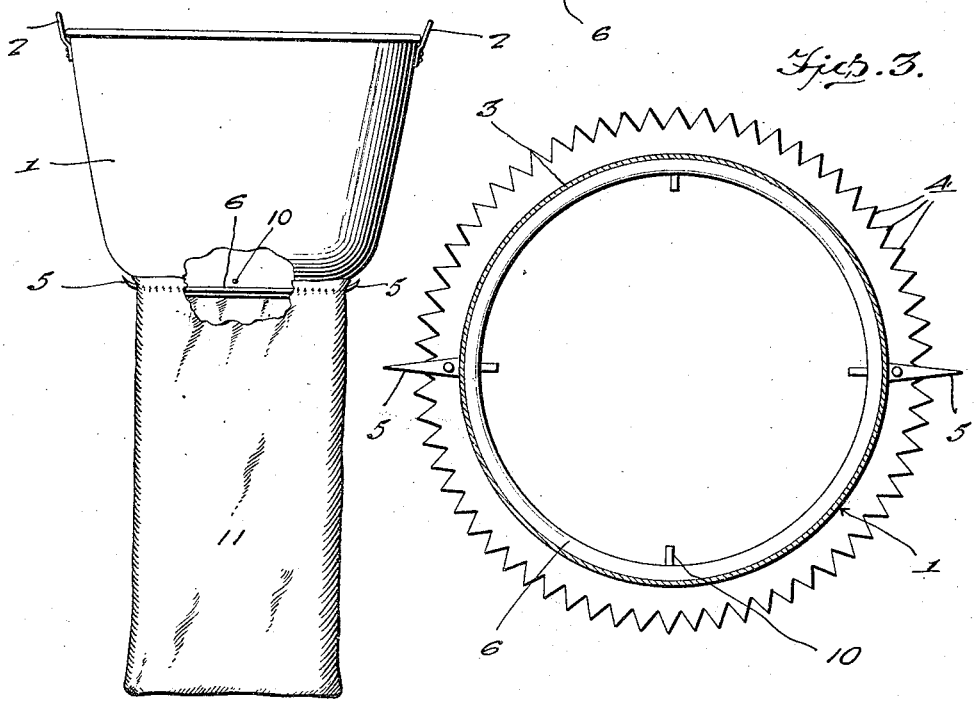

Patented May 27, 1924.

1,495,837

UNITED STATES PATENT OFFICE.

LEO A. GARSKE, OF DULUTH, MINNESOTA.

BASKET.

Application filed December 30, 1922. Serial No. 609,934.

*To all whom it may concern:*

Be it known that I, LEO A. GARSKE, a citizen of the United States, residing at Duluth, in the county of St. Louis and State of Minnesota, have invented new and useful Improvements in Baskets, of which the following is a specification.

An object of this invention is to produce a basket primarily devised for farmers' use, provided with a removable bottom, having means on the lower edge thereof for engaging a bag, when the bottom is removed and the basket is employed for sacking.

To the attainment of the foregoing and other objects which will present themselves as the nature of the invention is better understood, reference is to be had to the drawings which accompany and which form part of this application.

In the drawings:—

Figure 1 is an elevation of a basket in accordance with this invention.

Figure 2 is a sectional view on the line 2—2 of Figure 1.

Figure 3 is a sectional view on the line 3—3 of Figure 1.

Figure 4 is a greatly enlarged fragmentary sectional view on the line 4—4 of Figure 2.

Figure 5 is a top plan view.

Figure 6 is a view showing the basket with the bottom removed and a sack secured to the open bottom thereof.

My improved basket is constructed wholly of metal shaped to that of an ordinary basket. The body of the basket is indicated by the numeral 1 and preferably the upper edge thereof is rolled and in the roll there may be a reinforcing wire. Below the beaded mouth of the basket, and at diametrically opposed points on the outer sides thereof are the handles 2.

The body of the basket is dished or rounded inwardly from its mouth to its lower edge, and its said lower edge is rolled outwardly and upwardly, as at 3. The edge of the said rolled portion is provided with teeth 4, and the said rolled portion may have riveted or otherwise secured thereto upwardly directed spurs 5, one of which being arranged in a line with each of the handle portions 2.

The open bottom of the basket has secured therein a ring 6 on which the cover that provides the bottom rests. As disclosed by the drawings this bottom cover is concavo-convex in cross section, the outwardly bulged portion of the said bottom cover being directed inwardly with respect to the basket. The bottom cover is indicated by the numeral 7 and is preferably centrally provided with a handle 8. The periphery of the bottom cover 7 has spaced notches 9 of a number corresponding to those of lugs 10 directed inwardly above the ring 6. The distance between the lugs 10 and the upper edge of the ring corresponds to the peripheral thickness of the bottom cover 7. The bottom cover when arranged in the basket has its notches 9 positioned to receive the lugs 10 therethrough, and the said cover is then given a partial turn so that the same is effectively locked in the body of the basket. The manner of removing the cover will be apparent. When the device is used for sacking purposes, the cover is removed and the mouth of a bag 11 is arranged around the toothed flange 3 at the base of the basket, the spurs 5 also piercing the sack 11.

It is though that the foregoing description, when taken in connection with the drawings will fully set forth the construction, operation and advantages of the improvement to those skilled in the art to which such inventions relate. It is, of course, to be understood that such changes from the construction as herein set forth as fall within the scope of what I claim, may be resorted to if desired.

Having described the invention, I claim:—

1. A metal basket having an open bottom, a ring secured therein providing a ledge, inwardly directed lugs above the ledge, a removable bottom member for the basket having peripheral notches to receive the lugs therethrough and designed to be turned on the ledge to bring the lugs out of register with the notches to lock the bottom in the basket.

2. A metal basket including a body portion having an open bottom, said body portion being rounded inwardly from its upper to its lower edge, and its said lower edge being curved outwardly to provide a flange which is provided with peripheral teeth and with oppositely directed spurs, said basket having handles in a line with the spurs, a ring secured in the bottom of the basket, inwardly directed lugs above the ring, a metal bottom cover which is concavo-convex in cross section and which has peripheral notches to receive therethrough the lugs to allow the turning of the bottom to lock the same in contacting engagement with the ring, and a handle for the removable bottom, as and for the purpose set forth.

In testimony whereof I affix my signature.

LEO A. GARSKE.